United States Patent [19]
De Hoxar

[11] Patent Number: 5,624,580
[45] Date of Patent: Apr. 29, 1997

[54] SEPARATING LIQUID SUSPENSIONS

[75] Inventor: David De Hoxar, Talybont-on-Usk, Great Britain

[73] Assignee: Southern Water Services Ltd., United Kingdom

[21] Appl. No.: 392,929

[22] PCT Filed: Jun. 17, 1994

[86] PCT No.: PCT/GB94/01311

§ 371 Date: Feb. 28, 1995

§ 102(e) Date: Feb. 28, 1995

[87] PCT Pub. No.: WO95/01215

PCT Pub. Date: Jan. 12, 1995

[30] Foreign Application Priority Data

Jul. 1, 1993 [GB] United Kingdom ............... 9313589

[51] Int. Cl.[6] .................... B01D 21/00; C02F 1/40
[52] U.S. Cl. ..................... 210/800; 210/767; 210/521
[58] Field of Search ................. 210/787, 788, 210/512.1, 512.3, 513, 521, 767, 800

[56] References Cited

U.S. PATENT DOCUMENTS 5,252,229  10/1993  Rojey et al. ......................... 210/787

FOREIGN PATENT DOCUMENTS

| | | |
|---|---|---|
| 2687395 | 8/1993 | France . |
| 959454 | 3/1957 | Germany . |
| 1124016 | 2/1962 | Germany . |
| 2046609 | 11/1980 | United Kingdom . |
| WO10597 | 9/1990 | WIPO . |
| WO17260 | 10/1992 | WIPO . |
| WO07946 | 4/1993 | WIPO . |

*Primary Examiner*—David A. Reifsnyder
*Attorney, Agent, or Firm*—Lucas & Just

[57] ABSTRACT

A method and apparatus for separating suspended solid particles and/or fluid droplets from a body of liquid is described. Fluid is caused to flow through at least one helical flow path defined between axially facing surfaces of a number of conical helical plates. Preferably, a substantially vertical flow channel of circular cross-section has disposed therein at least one conical helical plate with a diameter substantially equal to that of the flow channel. The conical helical plate or plates are arranged coaxially in the flow channel and define at least one helical flow path coaxial with the flow channel between axially facing surfaces of the plate or plates. The plate or plates are preferably capable of rotating about the axis of the flow channel, and may be driven. While they may be driven at a greater or lesser speed, they are preferably driven at a speed so as to approximately correspond with the flow rate of the liquid.

5 Claims, 3 Drawing Sheets

SEPARATING LIQUID SUSPENSIONS

The present invention relates to separating suspended matter or immiscible liquids from a fluid, and is particularly concerned with the separation of suspended sludge particles and oil droplets from domestic sewage effluents.

Inclined plate separators, in which a liquid suspension to be separated is caused to pass through an array of inclined plates, are a well known feature in the separation of suspended solids from a liquid. UK Patent application 2,046, 609 describes a liquid treatment plant in which arrays of flat plates inclined to the vertical are used to separate suspended solids from a body of liquid.

A principal disadvantage of inclined plate separators is that the array of flat plates through which the liquid passes requires a large horizontal area to be effective, and large unused volumes are needed adjacent the plates as the depth of the plate array is increased. An objective of the present invention is to provide an inclined plate separator of reduced dimensions in plan, so that the advantages of inclined plate separators may be employed in a separation plant of compact design.

According to a first aspect of the present invention, a separator for separating suspended solid particles and/or fluid droplets from a body of liquid comprises at least one conical helical plate with the axis of the helix extending vertically, the conical helical plate or plates defining at least one helical flow path between facing upper and lower surfaces of the plate or plates.

Preferably a plurality of coaxial helical plates, e.g. six, are provided, most preferably in an intertwined multiple helix configuration, to define a plurality of helical flow paths. The pitch of the helix may be equal to or greater than the diameter of the helix, but preferably is small when compared to its diameter, so that each helical plate makes many turns about the helix axis.

The plate or plates may be inclined either upwardly or downwardly in the radially outward direction, but in the preferred embodiment the plate or plates are inclined downwardly in the radially outward direction.

One or more separators may be arranged in a body of liquid to be treated in a tank, the separators being rotated to induce an axial flow of liquid along the helical flow paths. The direction of the axial flow depends on whether liquid is added to the tank at the top or the base of the body of liquid. When liquid is added to the tank at the base and drawn off at the top to remove denser solid or liquid impurities, the separator or separators are rotated so as to induce an upflow through the separators. Conversely, when liquid is added to the tank at the top and drawn off at the base to remove light solid or liquid impurities, the separator or separators are rotated so as to induce a downflow through the separators.

Preferably, the separator is arranged in a substantially vertical flow channel of circular cross-section and with the helical axis of the plate or plates coaxial with the flow channel, the separator having a diameter substantially equal to that of the flow channel. An axial flow of liquid along the channel, and thus along the helical flow paths, is induced by placing inlet and outlet means in the channel at locations spaced in the axial direction. Most preferably, such a separator is also capable of rotating about the helix axis when the separator is confined within the flow channel.

The rotation of the helical plate or plates may be induced by the flow of liquid along the helical flow paths, or may be imposed on the plates by a drive motor or other drive means. The speed of rotation of the plate or plate assembly may be such that the axial velocity of the fluid along the flow channel is equal to the product of the helix pitch and rotational speed and thus so that there is no circumferential motion, or alternatively the rotational speed of the plate or plate assembly may be arranged to be lower or higher than such a speed.

According to a second aspect of the present invention, a fluid treatment installation comprises a tank wherein a number of separators are disposed each comprising one or more conical helical plates defining at least one helical flow passage, and wherein an inlet means is arranged to supply unseparated fluid into a first part of the tank, and wherein an outlet means is arranged to withdraw treated fluid from the tank at a second part, the arrangement being such that between the inlet and the outlet means the fluid flows axially through the helical flow passage or passages of the separator.

Preferably the tank is a circular cylindrical tank closely surrounding the separator, and axial flow of fluid is caused by the axial spacing of the inlet and outlet means.

Alternatively, a number of separators may be placed in a non-circular tank and an axial flow of fluid is caused by the rotation of the separators.

Preferably, unseparated fluid is supplied into the lower part of the tank by flowing downwardly through a tubular wall surrounding the axis of the separator, and the plate or plates of the separator extend radially outwardly from the tubular wall.

Embodiments of the present invention will now be described in detail with reference to the accompanying drawings, in which.

Figure 1:
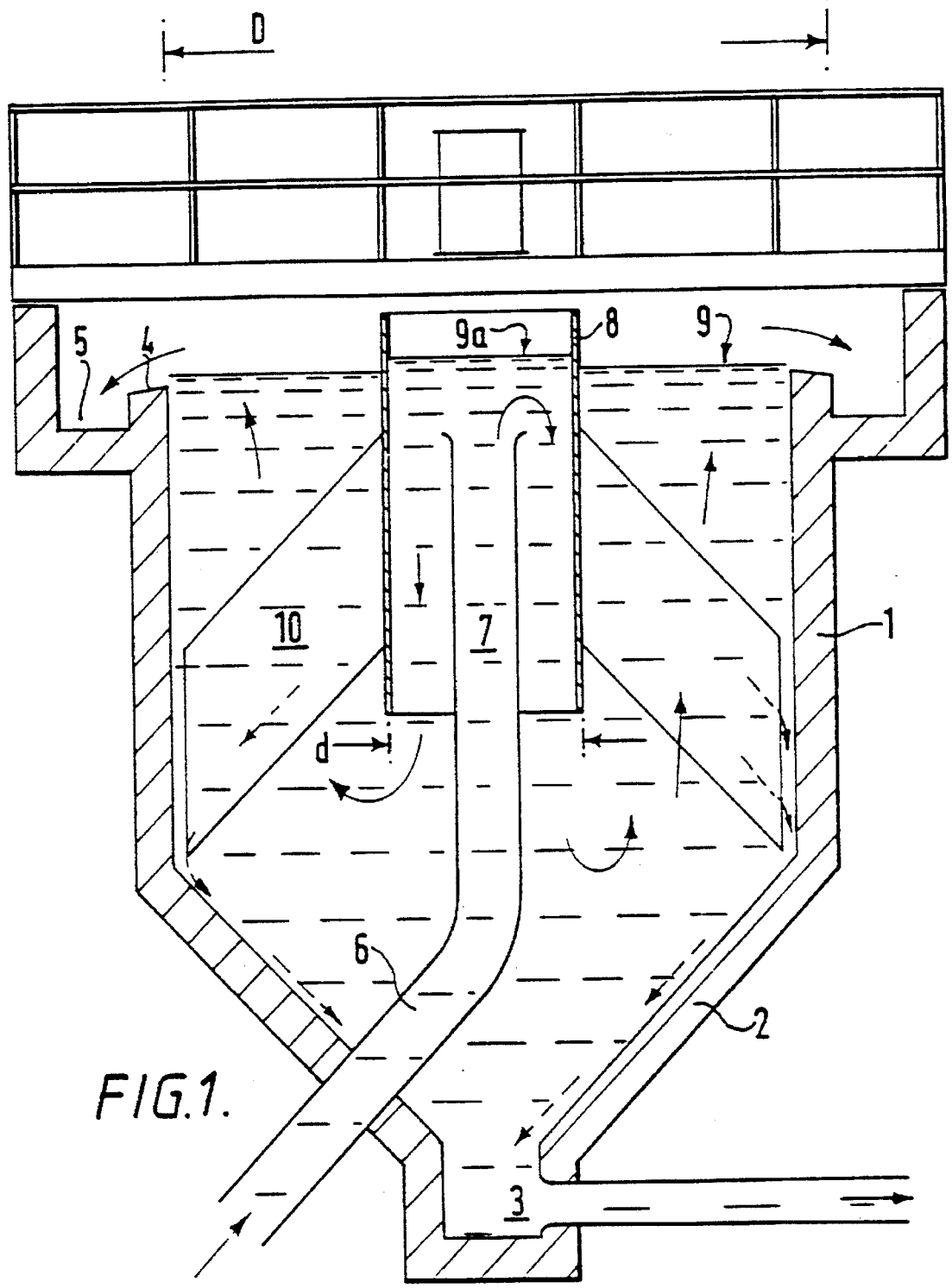
FIG. 1 is a schematic vertical section of a first treatment plant for separating suspended solids from a liquid.
Figure 2:
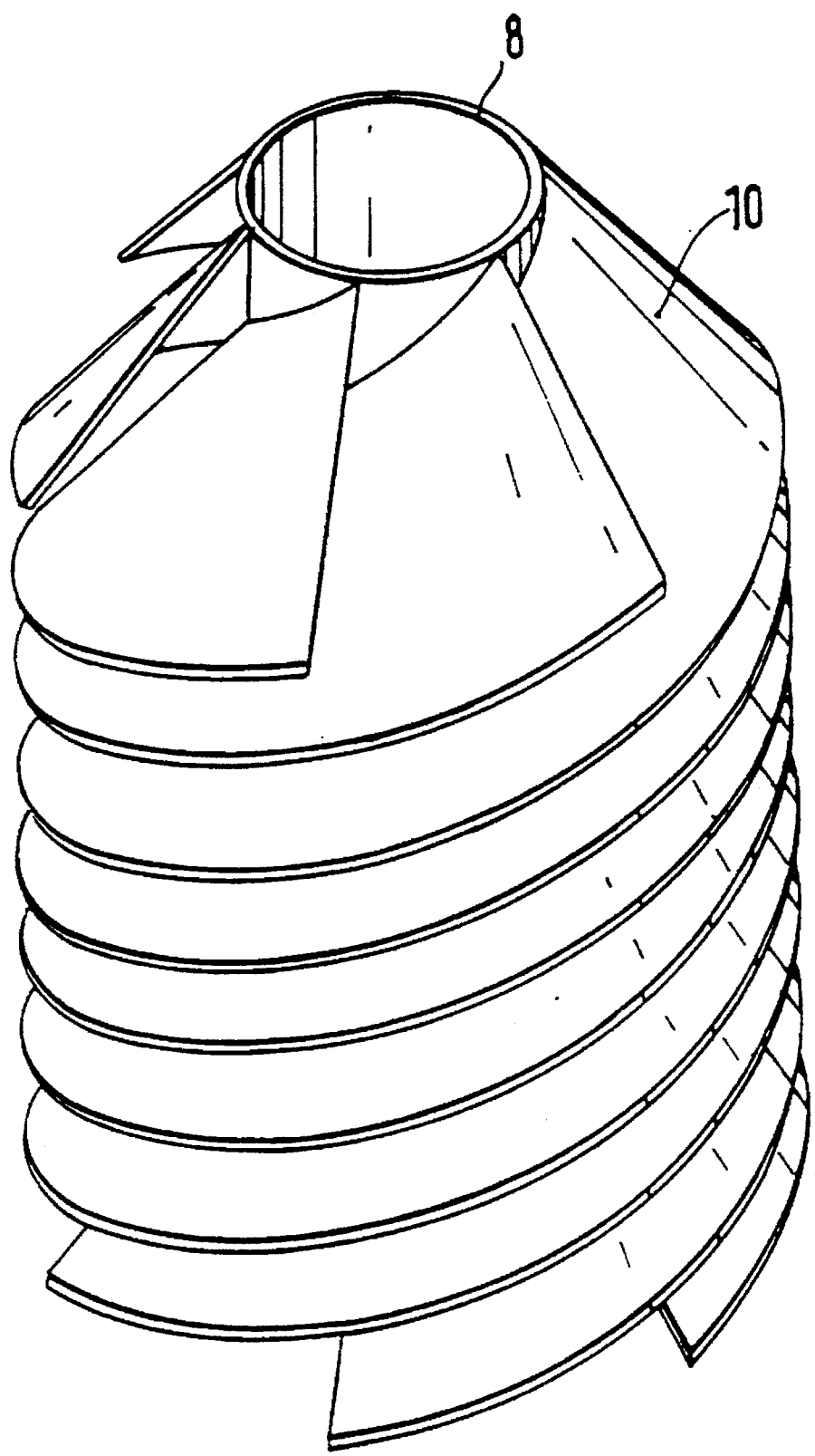
FIG. 2 is a perspective side view of the inclined plate separator element of the treatment plant seen in FIG. 1.

Referring now to the drawings, there is seen in FIG. 1 a water treatment plant comprising a cylindrical tank 1 having a maximum diameter D, and a conically tapered lower region 2 terminating at a central sludge outlet 3.

The upper edge of the cylindrical wall of the tank 1 is configured as a weir 4, and surrounding the weir 4 is an annular outflow channel 5 for collection of clarified liquid. An inlet pipe 6 enters the tank at its lower region 2, and extends inwardly to the axis of the tank. The inlet pipe 6 then includes a vertically rising section 7, which discharges the liquid to be treated at the upper region of the cylindrical portion of the tank 1.

Surrounding the riser 7, and spaced therefrom, is a cylindrical tubular wall 8 of diameter d which extends from above the level of the liquid surface 9 to approximately the mid region of the cylindrical portion 1 of the tank. Preferably the diameter d is approximately one third of the diameter D of the tank.

The outer surface of the tubular wall 8 supports a series of conical helical plates which extend downwardly and outwardly from the tubular wall 8, and extend circumferentially of the tubular wall 8 in an intertwined spiral formation. The plates 10 extend radially to terminate adjacent the cylindrical wall of the tank 1. The inclination of the plates, i.e. the acute angle measured between a radial line on the surface of the plate and the axis of the helix, is approximately 40° in the illustrated embodiment, but it is foreseen that different angles from approximately 10° to 80° may find utility in separating solids and immiscible fluids from a body of liquid. An angle of 60° has been found to be advantageous.

The plates 10 and tubular wall 8 are rotatable about the axis of the tank, and may be free to rotate under the action of the flowing liquid, or may be driven by an external drive means to rotate at a predetermined speed. The tubular wall 8 and plates 10 may be suspended from a bridge extending across the top of the tank, or may be supported by floats immersed in the liquid. As a further alternative, the tubular wall 8 and plates 10 may be supported from below on bearings situated within the tank.

In operation, contaminated liquid flows in through the inlet pipe 6 and up the riser section 7 to be discharged within the tubular wall 8 at or near the surface level. It will be appreciated that the surface level 9a within the tubular wall 8 may differ slightly from the surface level 9 in the remainder of the tank, which is regulated by the weir 4.

Contaminated liquid then flows axially downwardly within the tubular wall 8, until the lower end of the tubular wall 8 is reached. The flow direction is then reversed, so that the liquid flows upwardly through the array of helical plates 10.

As the liquid passes upwardly through the helical plates 10, fine particulate matter will be separated out, to be deposited on the upper surfaces of the plates 10. This particulate matter will coalesce and will then travel downwardly and radially outwardly along the upper surfaces of the plates, to be discharged adjacent the cylindrical wall 1 of the tank. The coalesced particulate matter will then sink down into the conical section of the tank to be directed towards the sludge outlet 3.

The upward flow of liquid through the helical plates 10 is preferably accompanied by a rotation of the helical plates 10, the speed of rotation and the pitch of the helical plates being preferably arranged to correspond with the vertical flow velocity of the liquid (the 'no swirl speed'). At the 'no swirl speed', the fluid will flow through the tank in a substantially vertical course. It may, however, be advantageous to drive the helical plate array at a rotation speed slightly in advance of, or slightly lagging behind, the upward flow velocity, so as to impart a small circumferential velocity to the body of liquid rising through the plate array. If the plates 10 are rotated at a speed slightly in excess of the 'no swirl speed', a circulation is induced in the tank 1 which leads to a radial outflow producing a descending annular curtain of fluid at the radially outer edge of the plates, as fluid is lifted through the plate assembly by the imposed excess rotation. This effect enhances the downflow of coalesced particulate matter in the radially outermost region of the tank, and discourages the formation of upward flows in this region which could result in some fluid bypassing the separator plates 10. Most advantageous results are obtained if the plate assembly is rotated at from about 100% to about 120% of the 'no swirl speed', but speeds of from 60% to 140% of the 'no swirl speed' have proved satisfactory, and speeds of up to 300% are not disadvantageous.

For example, if a tank of 10 $m^2$ cross-section is to treat 200 $m^2$ of fluid yet hour, then the upward flow velocity of the fluid is to be 20 meters per hour, and an array of helical plates having a pitch of 3 meters will have to be rotated at 6.33 revolutions per hour to achieve the 'no swirl speed'. The most preferred speed of rotation will therefore be from 6.33 to 7.6 revolutions yet hour. Satisfactory results have been achieved with axial fluid flow velocities of from 6 to 12 meters per hour, but axial velocities of from 6 to 60 meters per hour are foreseen.

In an advantageous embodiment, the array of plates 10 and the tubular wall 8 are positioned within the tank and are supported by floats immersed in the liquid, the tubular wall 8 and plates 10 rotating under the influence of the upwardly flowing liquid passing between the helical plates.

As an alternative to the configuration of plates shown, the direction of inclination of the plates may be arranged so that the plates extend upwardly and outwardly from the tubular wall 8, rather than downwardly and outwardly as shown in FIG. 1. In such a construction, openings will have to be formed in the plates at their radially inner edges so as to allow coalesced particles to fall through the plates. In such an arrangement, however, there may well be difficulties in that the flow of untreated liquid will have to pass through a region through which the coalesced particles are falling in order to reach the helical plate array. Such difficulties could be solved by arranging the inlet means round the periphery of the tank rather than at its centre.

If openings are provided through the plates 10 of the separator shown in FIG. 1 at or near their radially inner edges, this will allow coalesced droplets of buoyant fluids to migrate radially inwardly and upwardly along the under surfaces of the plates, to be discharged adjacent the tubular wall 8 at the upper end of the helical plate array. An annular collection device (not shown) my be installed at the outer surface of the tubular wall 8 to collect any separated buoyant fluids or particles, for separate discharge. The openings may also afford access for a cleaning device such as a water jetting tool, and may be aligned in the axial direction.

The apparatus is intended mainly for the treatment of contaminated water, to remove particulate matter such as sewage sludge and suspended buoyant fluids such as oil from the contaminated water. It is however foreseen that a fixed or rotating array of helical plates may be used to separate suspended denser or lighter solids or immiscible liquid droplets from any other liquid.

The tubular wall 8 and plate or plates 10 may be constructed from metal, preferably corrosion resistant metal, or may be formed from plastics material, with or without reinforcing additives such as glass or carbon fibres. Advantageously, the helical plate or plates are formed in blade-like sectors which may be joined at their radially extending edges to form helical plates. Interlocking formations, such as dowel pins and sockets or a tongue and groove arrangement, maybe used to ensure alignment between the blade sectors. At the ends of helical plates constructed from interlocking modules, the radially extending edges may be smoothed to prevent snagging of solids, either by shaping the end sectors or by fitting edge strips of suitable contour to the exposed radial edges.

In the preferred embodiment, the cylindrical wall 1 and conical lower portion 2 of the tank are situated at or below ground level, but it is further foreseen that the entire assembly may be mounted above ground level, or may even be raised above ground level to be mounted on a supporting structure. The height of the tank 1 may be increased to a far greater depth than is possible with arrays of flat plates, but is advantageously approximately 1.5 to 2 times its diameter.

The tank may be of constant diameter throughout its height, rather than tapered at the lower part as seen in FIG. 1. The base of such a constant diameter tank may be conical, to direct settled sludge radially outwardly, and may have a rotary sludge scraper means to collect sludge and move it toward a discharge opening. Most advantageously, the rotary sludge scraper may rotate at the same speed as the helical plates, and they may have a common drive means.

Figure 3:
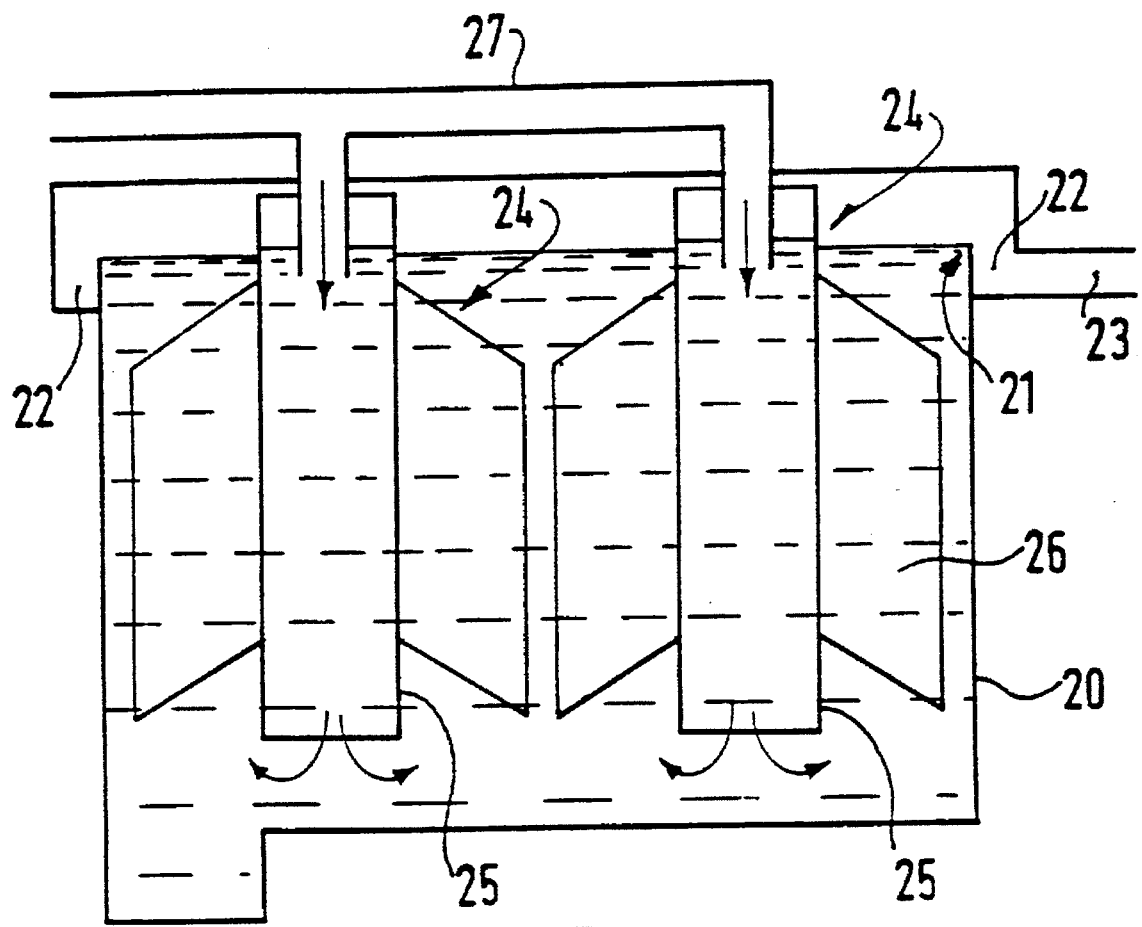
FIG. 3 is a schematic plan view of a second treatment plant for separating suspended solids from a liquid.

In FIG. 3, a schematic sectional view of an alternative treatment installation is seen. In this installation, a tank 20 is provided about its upper periphery with a weir 21 and a collection channel 22 leading to a discharge outlet 23 for clarified liquid. The tank 20 can be of any convenient platform, for example rectangular, polygonal, triangular, etc. Within the tank 20 are arranged a number of separators 24, comprising central tubular walls 25 with radially outwardly and downwardly extending helical plates 26 extending therefrom. The separators 24 are supported in the tank 20 by support means (not shown) and are driven in rotation about their vertical axes by a drive motor and transmission (not shown). Inlet means 27 supplies liquid to be treated into the upper ends of the tubular walls 25, whence the liquid flows down to the lower part of the tank 20.

The separators 24 are rotated by the drive means so as to induce an upward flow of liquid through the helical plates 26, and the speed of rotation of the separators and the flow rate of liquid through the tank are preferably adjusted so that the upward flow produced by the separators slightly exceeds the total flow rate of liquid through the tank, to produce a slight downflow in the areas between the separators. This downflow serves to prevent untreated liquid from bypassing the separators.

Clarified liquid is drawn off via a weir 21 into a channel 22 and thence to an outlet 23.

Figure 4:
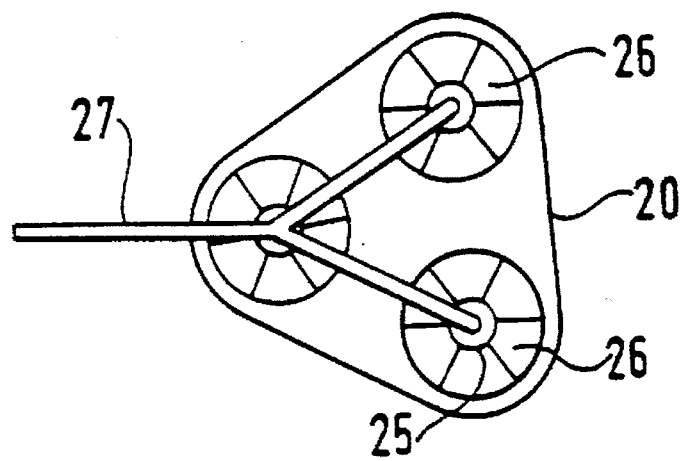
FIG. 4 is a plan view of the tank of the treatment plant seen in FIG. 3.

FIG. 4 shows a plan view of a triangular tank 20 fitted with three separators 24, inlet ducting 27 supplying liquid to the central space within the walls 25 of the separators. It is however to be understood that the tank 20 may have any desired shape in plan, and my contain internal filler blocks to occupy at least partially the volume within the tank between the separators 24.

Clarified liquid is drawn off via a weir into a channel and thence to an outlet such as are shown at 21 22 and 23 in FIG. 3.

I claim:

1. A method for separating a suspended phase from a body of liquid in a non-cyclonic gravity sedimentation separator, comprising introducing untreated liquid through an inlet into a flow channel in the sedimentation separator, coalescing the suspended phase to form a coalesced suspended phase and a treated liquid; removing said treated liquid from the flow channel through a first outlet, and removing the coalesced suspended phase through a second outlet, arranging the location of the first outlet and the second outlet at locations spaced in vertical direction, configuring and orienting the inlet and the first and second outlets so as to impart substantially no circumferential motion to flow of liquid in the flow channel, and controlling the flow from the inlet to the first outlet so that it is in a vertical direction in the channel and is at a predetermined speed and wherein the liquid is constrained to flow at a predetermined rate through a vertical flow channel of circular cross-section wherein is situated at least one conical helical plate with a diameter substantially equal to that of the flow channel, the conical helical plate or plates being arranged coaxially in the flow channel and defining at least one helical flow path coaxial with the flow channel between facing surfaces of the plate or plates.

2. A method according to claim 1, further including the step of rotating the conical helical plate.

3. A method according to claim 2, wherein the helical plates have a speed of rotation and a pitch and they are arranged so that axial flow velocity of the liquid is from 60% to 140% of the product of the pitch and the speed of rotation.

4. A method of separating solid or liquid particles from a liquid according to claim 3, wherein axial flow velocity of the liquid is from 100% to 120% of the product of the pitch and the speed of rotation.

5. A method according to claim 1, wherein the liquid is caused to flow through a helical flow path by rotating the helical plate or plates in a body of liquid to be treated.

* * * * *